(No Model.)
T. R. ALMOND & L. J. GROSHEAN.
LUBRICATING DEVICE FOR LOOSE PULLEYS.
No. 412,826. Patented Oct. 15, 1889.
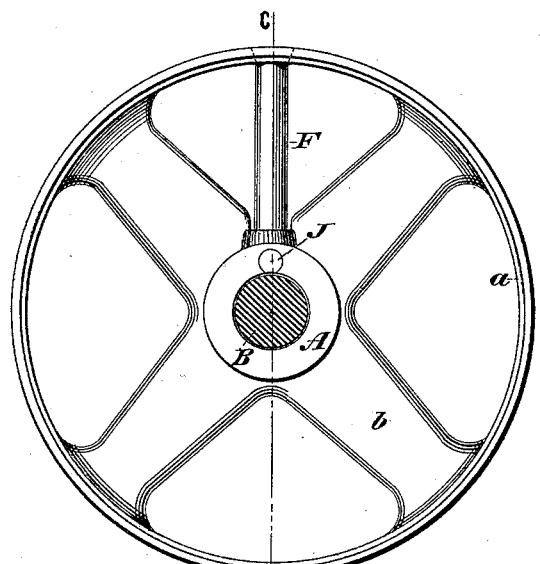
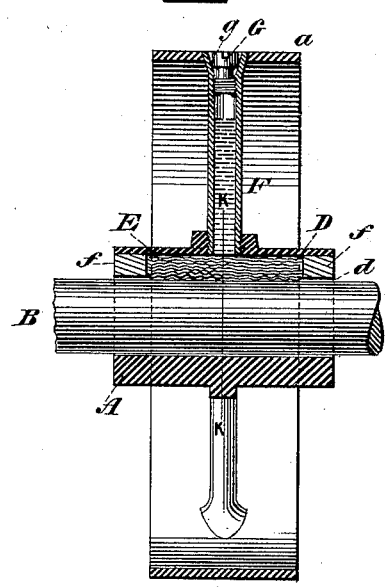
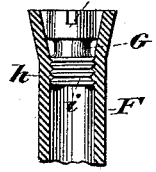
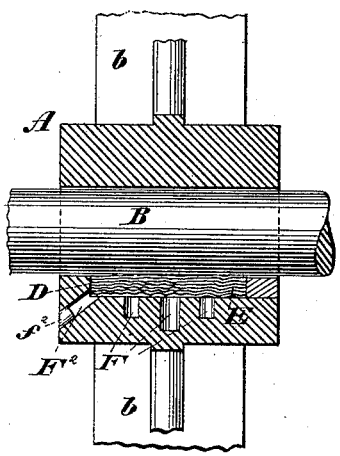
WITNESSES:
Gustave Dieterich
T. F. Bourne
INVENTORS
Thomas R. Almond and
Louis J. Groshean
BY Brieren, Steele & Knauth
ATTORNEYS

UNITED STATES PATENT OFFICE.

THOMAS R. ALMOND, OF NEW YORK, AND LOUIS J. GROSHEAN, OF BROOKLYN, NEW YORK.

LUBRICATING DEVICE FOR LOOSE PULLEYS.

SPECIFICATION forming part of Letters Patent No. 412,826, dated October 15, 1889.

Application filed June 26, 1889. Serial No. 315,634. (No model.)

*To all whom it may concern:*

Be it known that we, THOMAS R. ALMOND, of the city of New York, county and State of New York, and LOUIS J. GROSHEAN, of the city of Brooklyn, Kings county, New York, have invented an Improved Lubricating Device for Loose Pulleys, &c., of which the following is a specification.

The object of our invention is to provide improved means for lubricating loose pulleys and the like, so that it will be necessary to supply the lubricant to the pulley only at long intervals.

The invention consists in the novel details of improvement and the combinations of parts that are more fully hereinafter set forth.

Reference is to be had to the accompanying drawings, forming part of this specification, wherein—

Figure 1 is a side view of a pulley containing our improvements. Fig. 2 is a vertical cross-section on the plane of the line $c\,c$, Fig. 1. Fig. 3 is an enlarged detail section on the line $k\,k$, Fig. 2. Fig. 4 is a sectional detail, enlarged, of the lubricating feed-tube and its stopper; and Fig. 5 is a sectional view of a modification.

The letter A in the drawings indicates the hub of a pulley.

$a$ is the rim, and $b$ are the spokes connecting the hub and rim, which may all be of suitable construction.

B is a shaft upon which the pulley is to rotate.

In the hub A of the pulley is a channel D, within which is placed an absorbent material E—such, for instance, as wicking, cotton-waste, or the like. (See Figs. 2 and 3.) The channel D is made close to the bore $d$ of the pulley, through which the shaft passes and communicates with said bore $d$ through a slot $e$, which is narrower than the width of said channel, as indicated in Fig. 3. The inclosing-walls of this channel effectually retain the absorbent material against displacement by centrifugal action, and the slot $e$, communicating with the bore $d$, being much narrower than the width of said channel, the absorbent material is held in place and cannot escape from the channel, as the slot $e$ is too narrow to permit this. The ends of the channel D, if said channel is longitudinal, are closed by one or more plugs $f$ after the absorbent material is placed in said channel.

F is a chamber communicating with the outer side of the channel D, being the side farthest away from the bore $d$. It constitutes a centrifugal chamber for receiving the lubricant from the channel D. The chamber F may be long, as in Figs. 1 and 2, or short, as in Fig. 5. There may be several such chambers F, as is also shown in Fig. 5. The oil may be supplied through the chamber F, as in Fig. 2, or through a separate feed-opening $F^2$, as in Fig. 5.

Our improved lubricating device operates as follows: After the channel D is supplied with the lubricant the material E will absorb a certain quantity of the same, and a small quantity of the lubricant from said absorbent will find its way to the shaft. When the pulley rotates, the largest proportion of the lubricant will, as long as there is an excess, be forced away from the absorbent into the outer part of chamber F by centrifugal action. If, when the pulley is stationary, the chamber F is below the shaft B, the absorbent material will not receive the lubricant from said chamber; but the moment the pulley begins its rotation so as to bring the chamber above the shaft the lubricant will run upon the absorbent material E and be conducted thence to the shaft. If there were no absorbent material E between the chamber F and the shaft, the lubricant, when the tube was above the shaft, would flow in a body and be quickly wasted. Should any excess of oil get to the shaft, the edge of the slot $e$ will, when the pulley revolves, gather the same in and return it to the absorbent. When there is but very little oil held by the absorbent, the centrifugal action will carry that little toward the chamber F, where the absorbent is most yielding, thus concentrating the small amount of oil in a limited space, whence, upon the cessation of rotation, it may still reach the shaft to an extent sufficient to produce satisfactory lubrication.

By the use of the centrifugal chamber in conjunction with the channel D and the absorbent therein the oil is kept from being wasted, and a small charge of oil will properly lubricate the pulley for a long time.

In order to prevent the oil or its equivalent from flying out through the feed-opening during the centrifugal action, the plug G, for closing the feed-opening, must be adapted to form a tight joint. To this end the feed-opening is made flaring above its threaded portion $h$, and the plug G has a head $g$ above its threaded portion $i$, said head entering the flaring mouth of the feed-opening and the lower edge of the head, producing by pressure upon the interior conical surface of said flaring mouth a very tight joint. (See Fig. 4.)

Having now described our invention, what we claim is—

1. The hub A, provided with a bore $d$ for the passage of the shaft B, and having a longitudinal channel D open throughout its length to said bore and extending along parallel therewith, said channel being provided with absorbent material and having inclosing-walls to retain the absorbent material against displacement by centrifugal action, and a radial centrifugal collecting-chamber F, closed at its outer end, projecting from the rear wall of the channel, and opening into the channel behind the absorbent material, substantially as described.

2. The hub A, provided with a bore $d$ for the passage of the shaft B, and having a longitudinal channel D extending along parallel with said bore and communicating therewith by a longitudinal slot of less width than the channel, absorbent material confined within the channel, an end plug $f$ for the ready insertion and removal of said material, and a radial centrifugal collecting-chamber F, projecting from the rear wall of the channel behind the absorbent material, substantially as described.

3. The chamber F, having the threaded feed-opening provided with the funnel-shaped flaring mouth, combined with the threaded plug G, the head of said plug having a circular inner edge abutting against the inclined wall of said funnel-shaped mouth, so as to make a tight jam therewith, substantially as described.

THOMAS R. ALMOND.
LOUIS J. GROSHEAN.

Witnesses:
HARRY M. TURK,
T. F. BOURNE.